(12) United States Patent
Leung et al.

(10) Patent No.: US 11,734,424 B2
(45) Date of Patent: *Aug. 22, 2023

(54) SAS SOLUTION TO AUTOMATICALLY CONTROL DATA FOOTPRINT

(71) Applicant: BlueOwl, LLC, San Francisco, CA (US)

(72) Inventors: Theobolt N. Leung, San Francisco, CA (US); Micah Wind Russo, Oakland, CA (US)

(73) Assignee: BlueOwl, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,891

(22) Filed: Dec. 7, 2022

(65) Prior Publication Data

US 2023/0117285 A1    Apr. 20, 2023

Related U.S. Application Data

(63) Continuation of application No. 17/347,169, filed on Jun. 14, 2021, now Pat. No. 11,544,376, which is a continuation of application No. 16/206,041, filed on Nov. 30, 2018, now Pat. No. 11,062,025.

(51) Int. Cl.
  *G06F 21/00* (2013.01)
  *G06F 21/55* (2013.01)
  *G06F 21/56* (2013.01)

(52) U.S. Cl.
  CPC .......... *G06F 21/554* (2013.01); *G06F 21/552* (2013.01); *G06F 21/56* (2013.01)

(58) Field of Classification Search
  None
  See application file for complete search history.

(56) References Cited

U.S. PATENT DOCUMENTS

| | | | |
|---|---|---|---|
| 9,380,429 B1 | 6/2016 | Kurani | |
| 9,946,897 B2 | 4/2018 | Lovin | |
| 2006/0282660 A1* | 12/2006 | Varghese | G07F 7/1083 713/155 |
| 2008/0288882 A1 | 11/2008 | Fink | |
| 2013/0179970 A1 | 7/2013 | Bhola et al. | |
| 2014/0053069 A1* | 2/2014 | Yan | G06Q 10/0635 715/259 |
| 2016/0044497 A1* | 2/2016 | Soini | H04W 24/02 455/419 |

(Continued)

*Primary Examiner* — Andrew J Steinle
(74) *Attorney, Agent, or Firm* — Faegre Drinker Biddle & Reath LLP

(57) ABSTRACT

Systems and methods of automatically controlling a user's data footprint are provided. Data associated with a user may be analyzed to determine an action the user is preparing to take. Based on the analysis, a potential risk associated with the action the user is preparing to take may be identified. The potential risk associated with the action the user is preparing to take may be, for example, a data security risk, a data privacy risk, a physical risk, a risk of damage to property, and/or a financial risk. A notification indicating the potential risk associated with the action the user is preparing to take may be provided to the user. The notification may include one or more suggestions for mitigating the potential risk associated with the action the user is preparing to take.

20 Claims, 3 Drawing Sheets

300

302
Analyze data associated with user to determine action user is preparing to take

304
Identify, based on analysis, potential risk associated with action user is preparing to take

306
Provide notification indicating potential risk associated with action user is preparing to take

(56) References Cited

U.S. PATENT DOCUMENTS

| | | |
|---|---|---|
| 2017/0068827 A1 | 3/2017 | Sachs |
| 2018/0053394 A1 | 2/2018 | Gersten |
| 2019/0081965 A1* | 3/2019 | Oz .................. G06N 20/00 |

* cited by examiner

300

302
Analyze data associated with user to determine action user is preparing to take

304
Identify, based on analysis, potential risk associated with action user is preparing to take

306
Provide notification indicating potential risk associated with action user is preparing to take

FIG. 3

SAS SOLUTION TO AUTOMATICALLY CONTROL DATA FOOTPRINT

CROSS-REFERENCE TO RELATED APPLICATIONS

This application is a continuation of U.S. patent application Ser. No. 17/347,169, filed Jun. 14, 2021, which is a continuation of, and claims the benefit of U.S. patent application Ser. No. 16/206,041, filed Nov. 30, 2018, the disclosure of which is hereby expressly incorporated by reference herein in its entirety.

FIELD OF THE DISCLOSURE

The present disclosure generally relates to data privacy and, more particularly, to an SAS solution to automatically control a user's data footprint.

BACKGROUND

As companies extract more and more data from customers, a customer's exposure to data leaks, hacking, identity theft, and other risks continues to grow. However, customers may not be aware of these risks associated with providing their data to these companies.

SUMMARY

In one aspect, a computer-implemented method of automatically controlling a user's data footprint is provided. The method comprises: analyzing, by a processor, data associated with a user to determine an action the user is preparing to take; identifying, by a processor, based on the analysis, a potential risk associated with the action the user is preparing to take; and providing, by a processor, to the user, a notification indicating the potential risk associated with the action the user is preparing to take.

In another aspect, a computer system for automatically controlling a user's data footprint is provided. The computer system comprises one or more processors and one or more memories storing instructions. The instructions, when executed by the one or more processors, cause the computer system to: analyze data associated with a user to determine an action the user is preparing to take; identify, based on the analysis, a potential risk associated with the action the user is preparing to take; and provide, to the user, a notification indicating the potential risk associated with the action the user is preparing to take.

In still another aspect, a computer-readable storage medium having stored thereon a set of instructions for automatically controlling a user's data footprint is provided. The instructions are executable by a processor, and comprise instructions for analyzing data associated with a user to determine an action the user is preparing to take; identifying, based on the analysis, a potential risk associated with the action the user is preparing to take; and providing, to the user, a notification indicating the potential risk associated with the action the user is preparing to take.

BRIEF DESCRIPTION OF THE DRAWINGS

FIG. 3 illustrates a flow diagram of an exemplary computer-implemented method of automatically controlling a user's data footprint, in accordance with some embodiments.

DETAILED DESCRIPTION

As companies extract more and more data from customers, a customer's exposure to data leaks, hacking, identity theft, and other risks continues to grow. However, customers may not be aware of these risks associated with providing their data to these companies.

Systems and methods of automatically controlling a user's data footprint are provided herein. A software-as-agent solution (i.e., a data agent) can act as a protective layer for user data by monitoring privacy policies and the user's continuing data exhaust, allowing users to control their data footprints automatically. In particular, the software agent may be configured to analyze a user's digital information to identify potential risks associated with actions a user has taken or is preparing to take.

For example, if a user visits a website and is prompted to enter his or her social security number, credit card information, or other sensitive information, the software agent may analyze the safety of the website, e.g., based on previous user complaints, publicized hacking incidents, etc., and indicate potential data security risks to the user. As another example, if a user is presented with a set of terms and conditions to read in order to use a website or a software, the software agent may analyze the terms and conditions using word recognition to flag potentially unsafe or unfavorable provisions within the terms and conditions for the user. In some instances, the software agent may analyze physical and/or property risks in addition to privacy risks. For example, the software agent may access email and/or calendar data associated with the user to detect potentially dangerous activities in which a user plans to engage—e.g., the data agent may detect that the user has purchased skydiving tickets, or may detect a calendar entry about a whitewater rafting trip. Based on these detections, the software agent may provide safety information and/or risk information related to these activities, and/or recommend precautionary steps for mitigating the risks associated with these activities.

Figure 1:
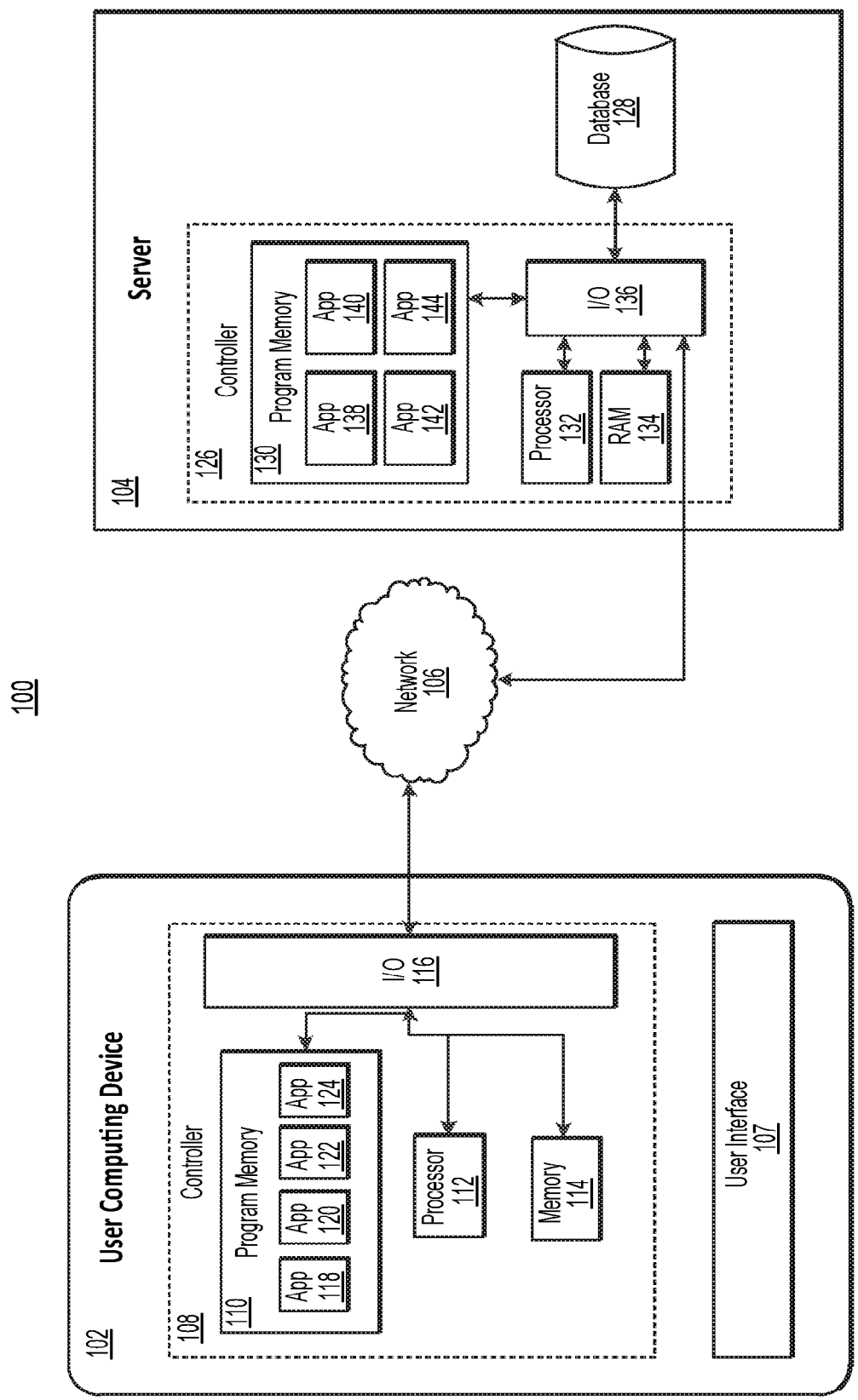
FIG. 1 illustrates an exemplary computer system for automatically controlling a user's data footprint, in accordance with some embodiments.

Referring now to FIG. 1, an exemplary computer system 100 for automatically controlling a user's data footprint is illustrated, in accordance with some embodiments. The high-level architecture illustrated in FIG. 1 may include both hardware and software applications, as well as various data communications channels for communicating data between the various hardware and software components, as is described below. As shown in FIG. 1, a user computing device 102, such as, e.g., a mobile device, a laptop, a personal computer, or any other computing device associated with a user, may communicate with a server 104 via a network 106.

Figure 2C:
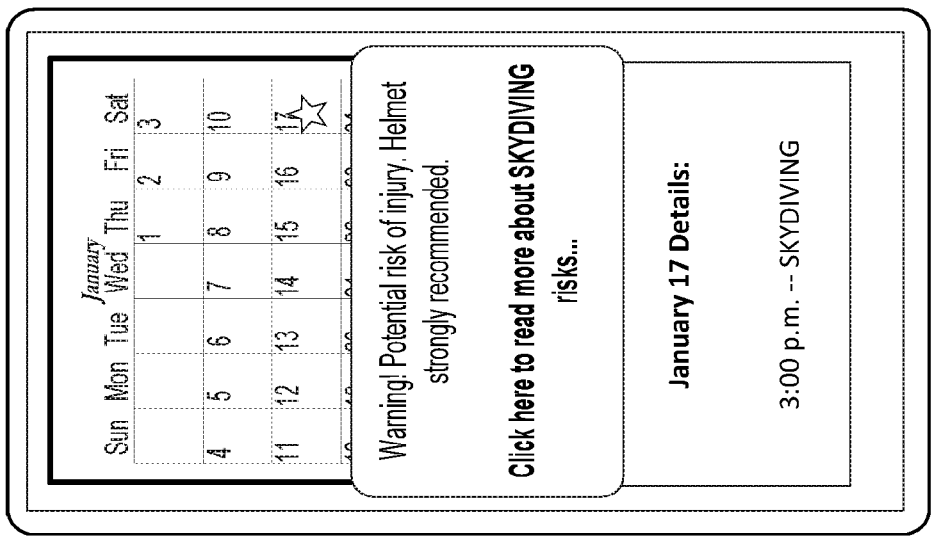
FIGS. 2A, 2B, and 2C illustrate several exemplary user interface displays, in accordance with some embodiments.
Figure 2B:
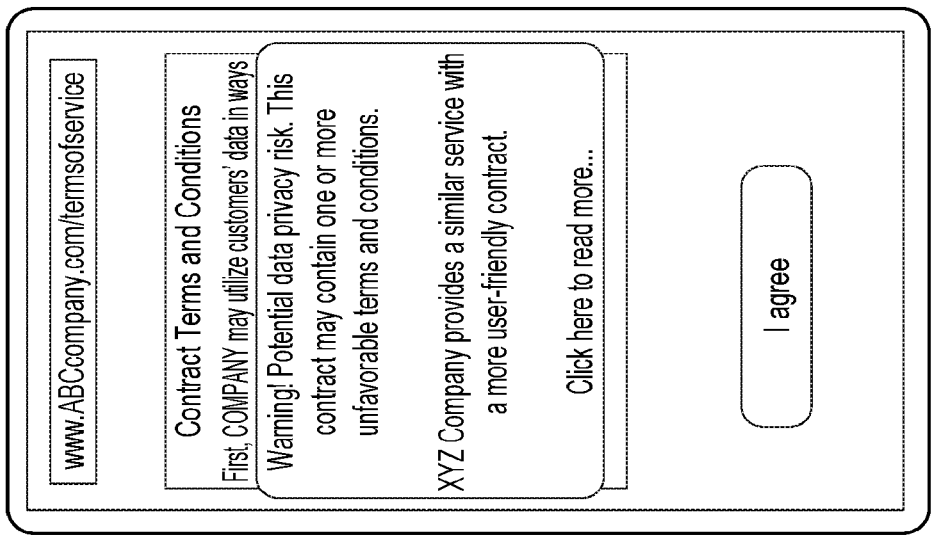
Figure 2A:
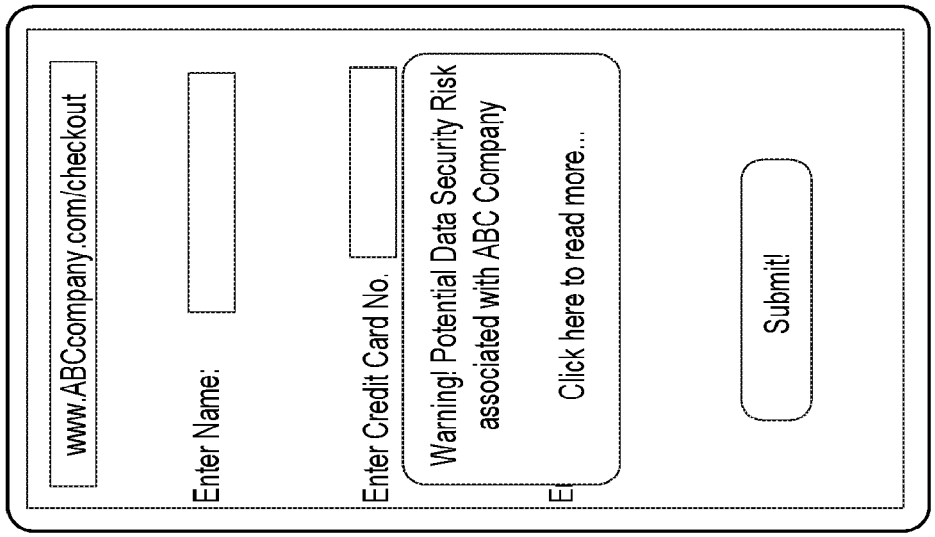

The user computing device 102 may include a user interface 107 and a controller 108. The user interface 109 may display or present information to users. For example, the user interface 109 may display a web browser, as well as notifications from other applications such as a calendar application, a messaging application, an email application, etc. Moreover, the user interface 109 may display a notification of a potential risk associated with an action the user is preparing to take (e.g., as shown in FIGS. 2A, 2B, and 2C). The controller 108 that may further include one or more program memories 110, one or more processors 112 (which may be, e.g., microcontrollers and/or microprocessors), one or more memories (RAMs) 114, and an input/output (I/O) circuit 116, all of which may be interconnected via an address/data bus. Although the I/O circuit 116 is shown as a single block, it should be appreciated that the I/O circuit 116 may include a number of different types of I/O circuits. The program memory 110 and RAM 114 may be implemented as semiconductor memories, magnetically readable memories, optically readable memories, or biologically readable memories, for example. Generally speaking, the program memory 110 and/or the RAM 114 may respectively include one or more non-transitory, computer-readable storage media. The controller 108 may also be operatively connected to the network 106 via a link.

The user computing device 102 may further include a number of various software applications 118, 120, 122, 124 stored in the program memory 110. Generally speaking, the applications 118, 120, 122, 124 may include a web browser application, an email application, a calendar application, and/or a messaging application. Furthermore, the applications 118, 120, 122, 124 may include applications for transmitting data to the server 104 and/or receiving data from the server 104, e.g., via the network 106. Moreover, the applications 118, 120, 122, 124 may include an application configured to perform one or more functions related to, inter alia, analyzing data associated with a user (which may in some instances be obtained from the other applications, such as the web browser application, email application, calendar application, messaging application, etc.) to determine an action the user is preparing to take; identifying, based on the analysis, a potential risk associated with the action the user is preparing to take; providing, to the user, a notification indicating the potential risk associated with the action the user is preparing to take, etc. In some instances, one or more of the applications 118, 120, 122, 124 may perform at least a portion of any of the method 300 shown in FIG. 3. The various software applications 118, 120, 122, 124 may be executed on the same processor 112 or on different processors. Although four software applications 118, 120, 122, 124 are shown in FIG. 1, it will be understood that there may be any number of software applications 118, 120, 122, 124. Further, two or more of the various applications 118, 120, 122, 124 may be integrated as an integral application, if desired. Additionally, it should be appreciated that in some embodiments, the user computing device 102 may be configured to perform any suitable portion of the processing functions described as being performed by the server 104, and vice versa.

As shown in FIG. 1, the server 104 may include a controller 126 that may be operatively connected to the one or more databases 128 via a link, which may be a local or a remote link. The one or more databases 128 may be adapted to store data related to automatically controlling a user's data footprint. For instance, the one or more databases 128 may store, inter alia, data related to actions associated with various risks, companies or other third parties associated with various types of risks, words and phrases indicative of actions a user is preparing to take and/or potential risks associated with those actions, website source code indicative of actions a user is preparing to take and/or potential risks of those actions, suggestions for mitigating various types of risk, etc. It should be noted that, while not shown, additional databases may be linked to the controller 126. Additionally, separate databases may be used for various types of information, in some instances, and additional databases (not shown) may be communicatively connected to the server 104 via the network 106.

The controller 126 may include one or more program memories 130, one or more processors 132 (which may be, e.g., microcontrollers and/or microprocessors), one or more random-access memories (RAMs) 134, and an input/output (I/O) circuit 136, all of which may be interconnected via an address/data bus. Although the I/O circuit 136 is shown as a single block, it should be appreciated that the I/O circuit 136 may include a number of different types of I/O circuits. The program memory 130 and RAM 134 may be implemented as semiconductor memories, magnetically readable memories, optically readable memories, or biologically readable memories, for example. Generally speaking, the program memory 130 and/or the RAM 134 may respectively include one or more non-transitory, computer-readable storage media. The controller 126 may also be operatively connected to the network 106 via a link.

The server 104 may further include a number of various software applications 138, 140, 142, 144 stored in the program memory 130. Generally speaking, the applications may perform one or more functions related to, inter alia, transmitting data to the user computing device 102, receiving data from the user computing device 102, accessing one or more databases 128, etc. Moreover, one or more of the applications 138, 140, 142, 144 may perform any suitable portion of the method 300 shown in FIG. 3. The various software applications 138, 140, 142, 144 may be executed on the same processor 132 or on different processors. Although four software applications 138, 140, 142, 144 are shown in FIG. 1, it will be understood that there may be any number of software applications 138, 140, 142, 144. Further, two or more of the various applications 138, 140, 142, 144 may be integrated as an integral application, if desired.

It should be appreciated that although the server 104 is illustrated as a single device in FIG. 1, one or more portions of the server 104 may be implemented as one or more storage devices that are physically co-located with the server 104, or as one or more storage devices utilizing different storage locations as a shared database structure (e.g. cloud storage). In some embodiments, the server 104 may be configured to perform any suitable portion of the processing functions remotely that have been described as being performed by the user computing device 102.

Turning now to FIGS. 2A, 2B, and 2C, several exemplary user interface displays are illustrated, in accordance with some embodiments. As shown in FIG. 2A, a user may be notified of a potential risk associated with an action the user is preparing to take. For example, as shown in FIG. 2A, a user may be notified of a data security risk associated with a third party company to which the user is preparing to provide personal information, such as his or her name, address, credit card number, etc. Moreover, as shown in 2A, a user may select an option to learn more information about the potential risk. FIG. 2B depicts another example of a notification a user may receive, indicating a potential risk associated with an action the user is preparing to take. As shown in FIG. 2B, a user may be notified of a data privacy risk associated with a contract the user is preparing to sign. As shown in FIG. 2B, a user may receive a notification including a suggestion for mitigating the data privacy risk associated with a contract from ABC Company. Specifically, the notification includes a suggestion of another company with more user-friendly terms of service. Moreover, as shown in 2B, a user may select an option to learn more information about the potential risk. As shown in FIG. 2C, a user may be notified of a physical safety risk associated with an activity the user is preparing to partake in, such as skydiving, as indicated by a digital calendar associated with the user. The notification may include a suggestion for mitigating the risk, e.g., a suggestion to wear a helmet. Moreover, as shown in 2C, a user may select an option to learn more information about the potential risk. Of course, the notifications shown in FIGS. 2A, 2B, and 2C are merely examples of user interface displays that may be provided in accordance with some embodiments. Additional or alternative user interface displays may be provided in various embodiments.

Turning now to FIG. 3, a flow diagram of an exemplary computer-implemented method 300 of automatically controlling a user's data footprint, in accordance with some embodiments. The method 300 can be implemented as a set of instructions stored on a computer-readable memory and executable on one or more processors.

Data associated with a user may be analyzed (block 302) to determine an action that the user is preparing to take. As one example, data associated with the user may be obtained from the user's web browser and analyzed to determine an action the user is preparing to take. This data may include indications of websites that the user is viewing or loading, or otherwise accessing, and the contents of these websites. Moreover, analyzing the data associated with a website may include analyzing text and images visible to a user (in some instances, via optical character recognition analysis) as well as analyzing source code associated with the website.

For instance, the user may view or load, or otherwise access a website that includes a form for providing user information to a third party, such as a bank, a company, or a government organization. This form may be identified based on text that is visible to the user on the website (e.g., "checkout", "user information", credit card", etc.) and/or source code associated with the website (e.g., source code for a fillable form). Accordingly, based on the user accessing a website that includes a form for providing user information to a third party, the method 300 may determine that the user is preparing to provide user information to the third party.

For example, the user may be shopping online and may access a retailer's website prompting the user to provide information such as the user's full name, the user's home address, the user's billing address, and the user's credit card number, as well as a PIN number or other security number associated with the credit card. Based on an analysis of the website text (e.g., words and phrases such as "billing address," "credit card number", "security code," "home address," etc.) as well as source code indicating the origin of the website, and the fields for the user to enter information near the detected text, the method 300 may determine that the user is preparing to provide his or her billing address, credit card number, security code, etc. to the retailer. As another example, the user may be applying online for a job at a certain company, and may load a company website prompting the user to provide his or her social security number, phone number, and address. Based on an analysis of the website text (e.g., words and phrases such as "social security number," "phone number," "address," etc.) as well as source code indicating the origin of the website, and the fields for the user to enter information near the detected text, the method 300 may determine that the user is preparing to provide his or her social security number, phone number, address, etc. to the company.

As still another example, the user may be using an online banking service, and may view a website prompting the user to provide a routing number or banking account number. Based on an analysis of the website text (e.g., words and phrases such as "routing number," "banking account number," etc.) as well as source code indicating the origin of the website, and the fields for the user to enter information near the detected text, the method 300 may determine that the user is preparing to provide his or her routing number, banking account number, etc. to the online banking service. Additionally, the user may be accessing a website associated with a government agency, and may be prompted to provide information such as the user's passport number, driver's license number, and/or social security number. Based on an analysis of the website text (e.g., words and phrases such as "passport number," "driver's license number," "social security number" etc.) as well as source code indicating the origin of the website, and the fields for the user to enter information near the detected text, the method 300 may determine that the user is preparing to provide his or her passport number, driver's license number, social security number, etc., to the government agency.

In various examples, the identity information the user is preparing to provide to the third party may include, e.g., the user's full name and/or the full name of a family member, the user's phone number, the user's credit card number, the user's bank account number, the user's social security number or other government-issued identification number (such as, e.g., a driver's license number, a passport number, etc.), the user's student identification number, the user's home address, the user's email address, the user's password or PIN number, an answer to a security question associated with the user, etc.

In another example, the user may view or load, or otherwise access a website that includes a digital contract and/or agreement, as well as a prompt for the user to sign the contract or otherwise agree to its terms and/or conditions. This digital contract and/or agreement may be identified based on text that is visible to the user on the website (e.g., contract terms and conditions) and/or as source code associated with the website (e.g., source code indicating a field configured to receive an acceptance of contract terms and/or conditions). to determine that the user is preparing to accept one or more of the terms and/or conditions. Accordingly, based on the analysis indicating that the user is accessing a website that includes a digital contract and/or agreement, the method 300 may determine that the user is preparing to sign the digital contract and/or agreement.

Moreover, in some examples, analyzing the data associated with the user to determine an action that the user is preparing to take may include analyzing email data, messaging data, and/or calendar data associated with the user. This email data, messaging data, and/or calendar data may be obtained, e.g., via applications of a computing device (such as a personal computer or a mobile device) associated with the user. The analysis may include analyzing words or phrases within the email data, messaging data, and/or calendar data associated with the user to identify words or phrases indicative of an action that the user is preparing to take. For instance, an email may include a confirmation from an airline. Words and phrases from the email such as "flight" and "airline" and "airport" and the destination may indicate that the user is preparing to take a flight to a certain location. As another example, texts messages sent and received by the user may include a confirmation of plans the user has made with friends. Words and phrases such as the name of a restaurant or bar (e.g., "Joe's Steakhouse"), and a date or time (e.g., "7 tonight") may indicate that the user is planning to go to a certain bar or restaurant at a certain date or time. As still another example, a calendar entry may indicate an event, appointment, or activity the user is preparing to attend at a certain date or time. Words or phrases such as the name of the event, appointment, or activity (e.g., "Company Lunch Meeting," "Doctor's Appointment", "Kayaking trip", etc.) and the date or time (e.g., 5:30 on Thursday the $1^{st}$) may indicate that the user is planning to go to a particular event, appointment, or activity at a certain time.

Based on the analysis, a potential risk associated with the action the user is preparing to take may be identified (block 304). For example, a potential risk associated with the action the user is preparing to take may be, e.g., a data security risk, a data privacy risk, a physical risk, a risk of damage to property, a financial risk, etc.

In an example in which the user views, loads, or otherwise accesses a website that includes a form for providing user information to a third party, identifying the potential risks associated with actions user is preparing to take may include obtaining historical data associated with the third party. For instance, historical data associated with the third party may include news reports associated with the third party, as well as better business bureau reports or other accreditation reports associated with the third party. Accordingly, potential risks associated with the action the user is preparing to take (providing the third party with personal information) may be identified based on this historical data. For instance, the historical data associated with the third party may indicate a data security breach associated with the third party (e.g., a publicized hacking incident, a data privacy incident, etc.). In that case, the potential risk associated with providing information to the third party may include the risk of the user's data being stolen, leaked, or otherwise used in a way the user does not intend the data to be used.

As another example, identifying the potential risks associated with actions a user is preparing to take may include comparing the web presence of the third party with the website that the user is viewing, loading, or otherwise accessing. For example, if the third party's web presence mainly includes references to "www.company.com," but the user is accessing a website with the URL: "www.company.biz," a potential risk may be identified. Namely, in that case, the potential risk may be that the third party may not be the company the user believes that it is.

In some examples, identifying the potential risk associated with the action the user is preparing to take may include detecting one or more words or phrases in a digital contract the user is preparing to sign, and identifying a potential risk associated with signing the contract based on the detected words or phrases. For example, a digital contract or agreement presented by a third party may include words or phrases indicating that, by signing, the user agrees to allow the third party access to certain customer data or certain customer mobile device applications. Consequently, the potential risk associated with signing the contract may be that the user does not realize that he or she is agreeing to allow the third party to access his or her data in this way. As another example, a digital contract or agreement presented by a third party may include words or phrases that are excessively favorable to the third party while unfavorable to the customer. Consequently, the potential risk associated with signing the contract may be a potentially risk of agreeing to potentially unfavorable terms and conditions.

Moreover, in some examples, identifying the potential risk associated with the action the user is preparing to take may include detecting one or more words or phrases in email, messaging, or calendar data, and identifying a potential risk associated with the action the user is preparing to take based on the detected words or phrases. For example, certain words or phrases in an email from a third party may indicate a risk of "phishing." As another example, certain words or phrases in email, messaging, or calendar data may indicate that the user is planning an activity that entails a personal risk. For example, a calendar event for "skydiving" may indicate that a user is planning to skydive. Accordingly, the risk associated with the action the user is preparing to take may be a physical risk (e.g., based on accident rates for activities like skydiving).

A notification may be provided (306) to the user, indicating the potential risk associated with the action the user is preparing to take. In some instances, the notification may be a warning about the potential risk. Moreover, in some instances, the notification may include one or more suggestions for mitigating the potential risk associated with the action the user is preparing to take.

For example, the notification may indicate that a third party company that the user is preparing to do business with has recently been hacked. In this example, the notification may additionally include a suggestion of a third party company that sells the same item the user is preparing to buy, with no historical data privacy breaches. As another example, the notification may include highlighting terms and/or conditions of a contract or agreement that may be unfavorable to the user. The notification may further include an explanation of these terms. Similarly, in this example, the notification may additionally include a suggestion of a third party that provides the same service or product without these unfavorable contract terms. As still another example, the notification may include statistics of risks associated with an action the user is preparing to take. For example, the notification may include statistics of risks associated with skydiving. In this example, the notification may further include a recommendation to purchase safety equipment to mitigate these risks.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present)

and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method comprising:
analyzing, by a processor, data associated with a user to determine an action that the user is preparing to take, the data comprising text data associated with the user;
detecting, by the processor, one or more words or phrases in the text data associated with the user;
identifying, by the processor, a potential risk associated with the action that the user is preparing to take based upon analyzing the data; and
providing, by the processor, a notification, the notification comprising an indication indicating the potential risk,
wherein the identifying, by the processor, a potential risk associated with the action that the user is preparing to take comprises identifying the potential risk based upon the detected one or more words or phrases in the text data.

2. The computer-implemented method of claim 1, wherein the identifying, by the processor, a potential risk associated with the action that the user is preparing to take further comprises:
obtaining, by the processor, historical data associated with a second entity related to the action;
analyzing, by the processor, the historical data associated with the second entity to identify one or more past data security breaches; and
identifying, by the processor, the potential risk based upon the one or more past data security breaches.

3. The computer-implemented method of claim 2, further comprising:
generating a suggestion to mitigate the potential risk;
wherein the notification further comprises the suggestions.

4. The computer-implemented method of claim 3, wherein the generating a suggestion to mitigate the potential risk comprises:
identifying a third entity related to the action that the user is preparing to take;
wherein the suggestion includes information associated with the third entity.

5. The computer-implemented method of claim 4, wherein the identifying, by the processor, a potential risk associated with the action that the user is preparing to take further comprises:
detecting one or more words or phrases in the digital contract; and
identifying the potential risk associated with the action that the user is preparing to take based upon the detected one or more words or phrases in the digital contract;
wherein the notification includes the one or more detected words or phrases.

6. The computer-implemented method of claim 1, wherein the data associated with the user further comprises a digital contract including at least one selected from a group consisting of contract terms, contract conditions and a field configured to receive an acceptance to at least a part of the digital contract.

7. The computer-implemented method of claim 1, wherein the text data associated with the user comprises communication data associated with the user, and wherein the communication data includes at least one selected from a group consisting of email data, messaging data, and calendar data.

8. The computer-implemented method of claim 1, wherein the potential risk associated with the action that the user is preparing to take includes at least selected from a group consisting of a data security risk, a data privacy risk, a physical risk, a risk of damage to property, and a financial risk.

9. A computer system comprising:
one or more memories storing instructions; and
one or more processors configured to execute the instructions to perform operations comprising:
analyzing data associated with a user to determine an action that the user is preparing to take, the data associated with the user comprising a digital contract;
detecting one or more words or phrases in the digital contract;
identifying a potential risk associated with the action that the user is preparing to take based upon analyzing the data, wherein the potential risk is identified based at least in part upon the detected one or more words or phrases in the digital contract; and
providing a notification, the notification comprising an indication indicating the potential risk.

10. The computer system of claim 9, wherein the operations further comprise:
obtaining historical data associated with a second entity related to the action;
analyzing the historical data associated with the second entity to identify one or more past data security breaches; and
identifying the potential risk based upon the one or more past data security breaches.

11. The computer system of claim 9, wherein the digital contract includes at least one selected from a group consisting of contract terms, contract conditions, and a field configured to receive an acceptance to at least a part of the digital contract.

12. The computer system of claim 9, wherein the operations further comprise:
generating a suggestion to mitigate the potential risk;
wherein the notification further comprises the suggestion.

13. The computer system of claim 9, wherein the generating a suggestion to mitigate the potential risk comprises:
identifying a third entity related to the action that the user is preparing to take;
wherein the suggestion includes information associated with the third entity.

14. The computer system of claim 9, wherein the potential risk associated with the action that the user is preparing to take includes at least selected from a group consisting of a data security risk, a data privacy risks, a physical risk, a risk of damage to property, and a financial risk.

15. A computer system comprising:
one or more memories storing instructions; and
one or more processors configured to execute the instructions to perform operations comprising:
analyzing data associated with a user to determine an action that the user is preparing to take, the data associated with the user comprising communication data associated with the user;
detecting one or more words or phrases in the communication data;
identifying a potential risk associated with the action that the user is preparing to take based upon analyzing the data, wherein the potential risk is identified based at least in part upon the detected one or more words or phrases in the communication data; and
providing a notification, the notification comprising an indication indicating the potential risk.

16. The computer system of claim 15, wherein the operations further comprise: obtaining historical data associated with a second entity;
analyzing the historical data associated with the second entity to identify one or more past data security breaches; and
identifying the potential risk based upon the one or more past data security breaches.

17. The computer system of claim 15, wherein the data associated with the user further comprises a digital contract, and wherein the digital contract includes at least one selected from a group consisting of contract terms, contract conditions, and a field configured to receive an acceptance to at least a part of the digital contract.

18. The computer system of claim 15, wherein the operations further comprise: generating a suggestion to mitigate the potential risk;
wherein the notification further comprises the suggestion.

19. The computer system of claim 18, wherein the generating a suggestion to mitigate the potential risk comprises:
identifying a third entity related to the action that the user is preparing to take;
wherein the suggestion includes information associated with the third entity.

20. The computer system of claim 15, wherein the potential risk associated with the action that the user is preparing to take includes at least selected from a group consisting of a data security risk, a data privacy risks, a physical risk, a risk of damage to property, and a financial risk.

* * * * *